US009672079B2

(12) United States Patent
Salamatov et al.

(10) Patent No.: US 9,672,079 B2
(45) Date of Patent: Jun. 6, 2017

(54) COMPOSE APPLICATION EXTENSION ACTIVATION

(71) Applicant: Microsoft Technology Licensing, LLC, Redmond, WA (US)

(72) Inventors: Andrew Salamatov, Seattle, WA (US); Jason Henderson, Redmond, WA (US); Oleg Ouliankine, Redmond, WA (US); Pretish Abraham, Sammamish, WA (US); Philip Yue-Leung Chan, Redmond, WA (US); Kee Hyuk Park, Seattle, WA (US); Shivani Chaturvedi, Redmond, WA (US); Sudhakar Pasupuleti, Issaquah, WA (US); Paul Virag, Seattle, WA (US); Angela So, Redmond, WA (US); Chia-Wei Chang, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/089,043

(22) Filed: Nov. 25, 2013

(65) Prior Publication Data

US 2015/0150028 A1    May 28, 2015

(51) Int. Cl.
 G06F 9/54   (2006.01)
 G06F 9/44   (2006.01)
 G06F 9/445  (2006.01)

(52) U.S. Cl.
 CPC .......... G06F 9/541 (2013.01); G06F 9/4443 (2013.01); G06F 9/44526 (2013.01)

(58) Field of Classification Search
 CPC .... G06F 9/541; G06F 9/44526; G06F 9/4443; G06Q 10/1093
 See application file for complete search history.

(56) References Cited

U.S. PATENT DOCUMENTS

| | | | |
|---|---|---|---|
| 6,785,867 B2 | 8/2004 | Shaffer et al. | |
| 8,381,206 B2 | 2/2013 | Balko et al. | |
| 2002/0035581 A1* | 3/2002 | Reynar et al. | 707/513 |
| 2004/0107089 A1* | 6/2004 | Gross et al. | 704/10 |
| 2005/0076037 A1* | 4/2005 | Shen | 707/100 |
| 2006/0085515 A1 | 4/2006 | Kurtz et al. | |
| 2007/0150513 A1* | 6/2007 | Vanden Heuvel et al. | 707/104.1 |
| 2008/0201434 A1 | 8/2008 | Holmes et al. | |
| 2009/0006994 A1* | 1/2009 | Forstall et al. | 715/764 |

(Continued)

FOREIGN PATENT DOCUMENTS

| | | |
|---|---|---|
| EP | 2549383 A2 | 1/2013 |
| WO | 2013085753 A1 | 6/2013 |

OTHER PUBLICATIONS

"Microsoft SharePoint 2010 SocialFest—Tim Uy and Jim Hsia share how Loqu8 Prelude Empowers Users with Just-in-Time, Contextual Information", Published on: Jan. 29, 2010, Available at: http://blogs.technet.com/b/bizspark_archives/archive/2010/01/29/microsoft-sharepoint-2010-socialfest-tim-uy-and-jim-hsia-share-how-loqu8-prelude-empSERGE BARYSIUKowers-users-with-just-in-time-contextual-information.aspx.

(Continued)

*Primary Examiner* — Syed Roni
(74) *Attorney, Agent, or Firm* — Merchant & Gould P.C.

(57) ABSTRACT

Activating an extension includes opening a first compose application by a first computing device. A composed document is received, and an extension is activated in response to the document. The extension may be activated as the document is being composed.

20 Claims, 7 Drawing Sheets

(56) References Cited

U.S. PATENT DOCUMENTS

| | | |
|---|---|---|
| 2010/0058199 A1 | 3/2010 | Gera et al. |
| 2011/0029988 A1* | 2/2011 | Mittal et al. |
| 2011/0106892 A1* | 5/2011 | Nelson et al. .............. 709/206 |
| 2011/0219083 A1 | 9/2011 | Nishi |
| 2012/0203862 A1* | 8/2012 | Tayeb et al. ................. 709/217 |
| 2013/0151635 A1 | 6/2013 | Soundrapandian |
| 2013/0151942 A1 | 6/2013 | Ouliankine et al. |
| 2013/0275429 A1 | 10/2013 | York et al. |
| 2013/0283139 A1 | 10/2013 | Claux et al. |

OTHER PUBLICATIONS

"Context. IO", Published on : Jan. 3, 2012, Available at: http://context.io/use-cases/crm.

Byrne, Randy, "What's New for Outlook 2013 Developers", Published on : Jul. 23, 2013, Available at: http://msdn.microsoft.com/en-us/library/office/jj228679.aspx.

"International Search Report and Written Opinion Issued in PCT Patent Application No. PCT/US2014/066483", Mailed Date: Jun. 18, 2015, 15 pages.

"International Preliminary Report on Patentability Issued in PCT Patent Application No. PCT/US2014/066483", Mailed Date: Apr. 6, 2016, 9 Pages.

"Second Written Opinion Issued in PCT Application No. PCT/US2014/066483", Mailed Date: Dec. 18, 2015, 5 Pages.

"Non-Final Office Action Issued in U.S. Appl. No. 15/399,340", Mailed Date: Feb. 10, 2017, 41 Pages.

* cited by examiner

COMPOSE APPLICATION EXTENSION ACTIVATION

BACKGROUND

An extension serves to extend the capabilities of or data available to a more basic host application. Such extensions are typically web based, and may provide external functionality to interact with content of the host application. External tools such as extensions can expand longevity of legacy solutions by providing new functionality to an existing application, for example.

SUMMARY

Extensions may be activated in conjunction with an application to enhance a user experience, for example. To activate an extension, a first compose application, such as an application for composing email messages, appointments, contacts, tasks, etc., is opened by a first computing device. A document composed by a user is received, for example using a compose form. An extension is activated in response to the document as the document is being composed.

The first extension may be configured to extract data from the received document and activate a second extension in response to the extracted data. The second extension is activated on a first computing device in some examples, and in other implementations, extracted and/or modified data are sent to a second computing device (e.g. via an email message) and the second extension is activated on the second, receiving computing device. Further, the extensions may be configured to modify a user interface of the compose form on one or both of the first and second computing devices.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

As used herein, an extension is an application that serves to extend the capabilities of, or data available to a more basic host application. Further, while an "add-in" program for an application may also add functionality to the host application, add-ins are typically coded to a specific version of a particular application client. In contrast, examples of the extensions disclosed herein are web based and can be cross form factor (one extension can run in both desktop, tablet, mobile, etc. platforms of a given application).

Figure 1:
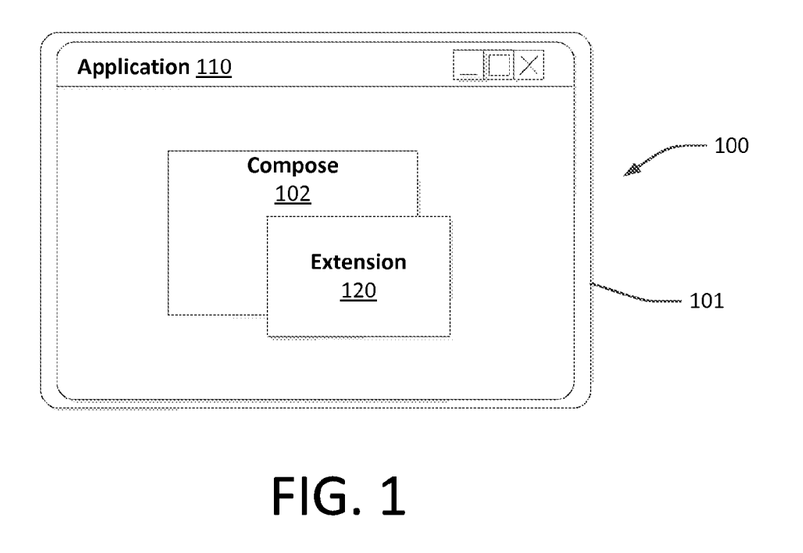
FIG. 1 illustrates aspects of an example of a general computing device including a compose application and extension.
Figure 2:
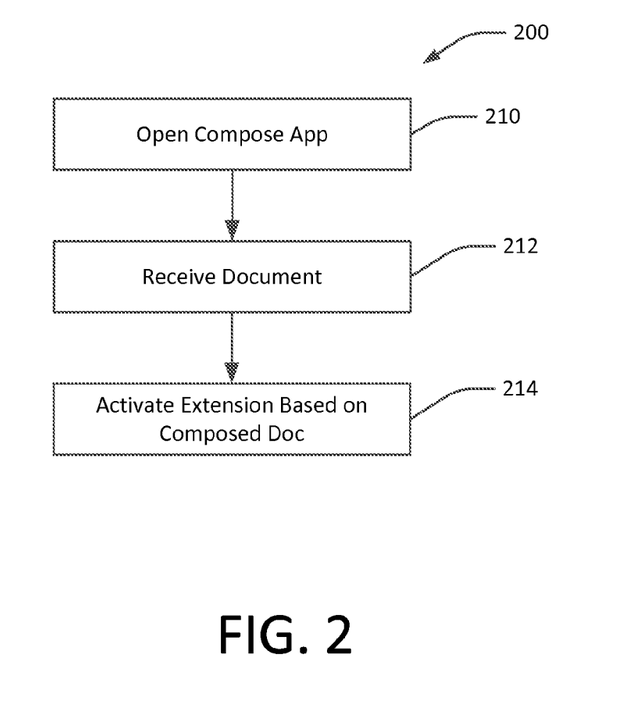
FIG. 2 illustrates aspects of an example of a method for activating an extension.

FIG. 1 illustrates aspects of an example system 100 including a computing device 101 executing an application 110 that has a compose form 102 and an extension 120. FIG. 2 is a flow diagram illustrating an example of a method 200 for activating the extension 120. As will be discussed further below, the system 100 is operable to open the compose application 110 as shown in block 210. The compose application 110 includes the compose form 102 that is configured to receive input from a user, such as an email document, a task, an appointment, etc. The extension 120 is activated in response to the document as the document is being composed by a user.

Typical extensions are activated based on a static document, such as a received email message. In certain examples disclosed herein, extensions 120 can be activated dynamically based on content of a document as the document is being created by a user. In some embodiments, the application 110 is an electronic message mail application, and the compose form 102 may be configured to receive any of an email message, instant message, appointment, contact, task, etc., and the extension 120 is dynamically activated based on properties of the composed document, content that the user wrote or is writing. Thus, if the received document includes a predetermined property, such as predetermined terms, times, dates, etc., the extension 120 is activated. Further, a plurality of the extensions 120 are associated with respective predetermined properties in some embodiments, so that different extensions 120 are activated in response to the document input via the compose form 102 including the respective properties.

For example, if the composed document received in block 212 using the compose form 102 of the application 110 is an appointment scheduled to begin at noon, a restaurant extension could activate that displays lunch reservation forms or a menu. If the document being composed is an email message discussing a sales transaction, an online payment extension could be activated in response to the composed document. While the embodiments provided thus far are described with respect to activating an extension based on predetermined properties, in other embodiments, the properties may be dynamically determined, for example, based upon patterns identified in the user's input or interaction with the application. For instance, the extension could also activate based on running a regular expression or natural language detection to identify intent from the text the user wrote (e.g., the user wrote down his SSN in the email, and an extension activates to tell him that writing his SSN is not allowed).

As noted above, the compose form 102 of the application 110 could be one of a plurality of different compose forms for inputting respective document types, such as compose forms for an email message, instant message, appointment, contact, task, etc. In some implementations, the extension 120 may be configured so as to activate for any such compose form via an application programming interface (API) associated with the application 110 that provides an interface for extensions 120 to the various input forms 102. In other embodiments, different compose forms 102 have respective APIs that are unique to the respective form 102, whereby the extensions 120 may be developed so as to change the format of the various compose forms 102, for example. This facilitates changing the user interface and user experience of the application 110 via the extension 120.

Figure 3:
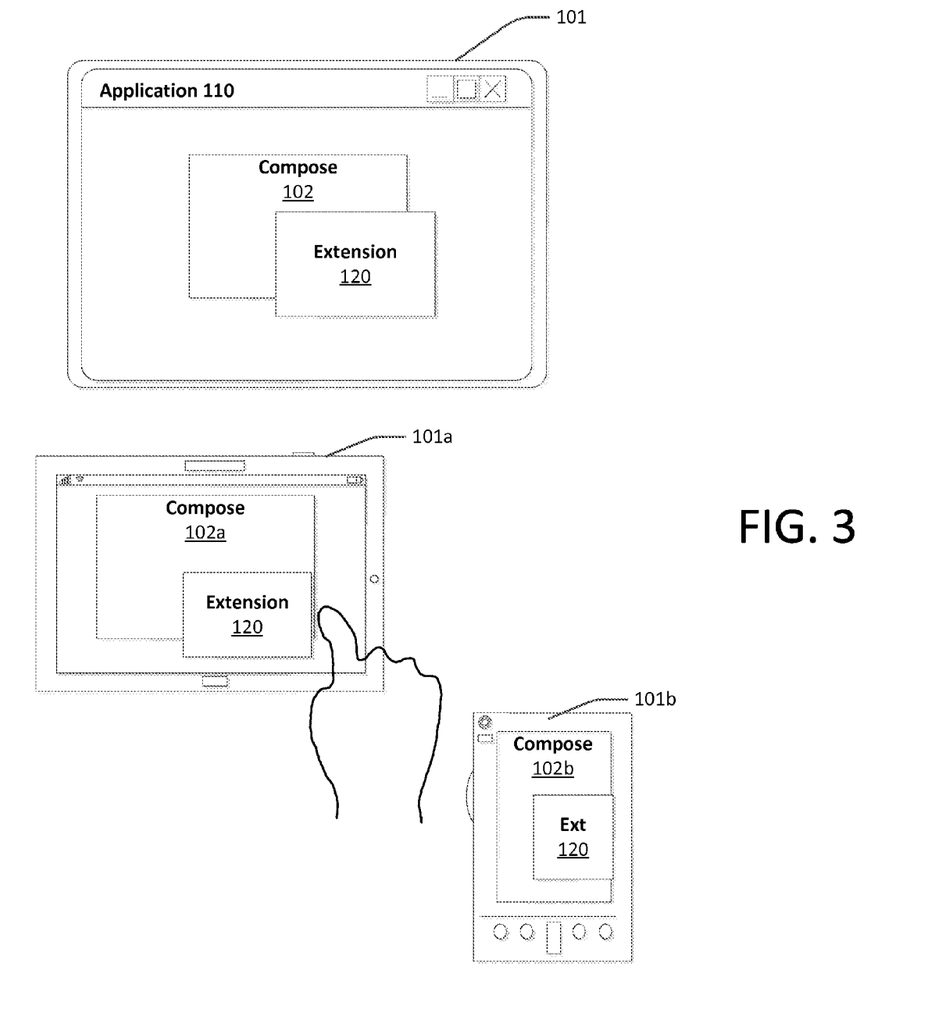
FIG. 3 illustrates examples of various platforms including a compose application and extension.

In some examples, extensions 120 are configured such that a given extension 120 may activate on different platforms. The platform may be a computing device running under a particular operating environment (e.g. MICROSOFT, APPLE, GOOGLE), an environment such as a thin client (e.g. a browser), a rich client, and the like. FIG. 3 illustrates the computing device 101 shown in FIG. 1 with the associated compose form 102 and extension 120, as well as a tablet computing device 101a and a mobile computing device such as a mobile "smart" phone 101b. The tablet 101a and the mobile phone 101b each include corresponding applications including compose forms 102a, 102b. In the illustrated implementation, the extension 120 is configured so as to be activatable on any of the illustrated computing devices 101,101a,101b based on a document input and received by the respective compose form 102,102a,102b. The extension 120 may be activated on the different platforms regardless of whether the computing devices 101, 101a, 101b utilize the same or different operating systems and/or the compose forms 102, 102a, and 102b are generated by the same or different applications. Activating the "same" extension 120 (e.g., a single set of program instructions executable by a plurality of platforms) simplifies the extension development process by eliminating or reducing the need for developing and maintaining program instructions for each of the various platforms. This is facilitated, for example, by developers specifying the APIs required for the particular extension 120, and activating the extension on any platforms that satisfy the API requirements.

Figure 4:
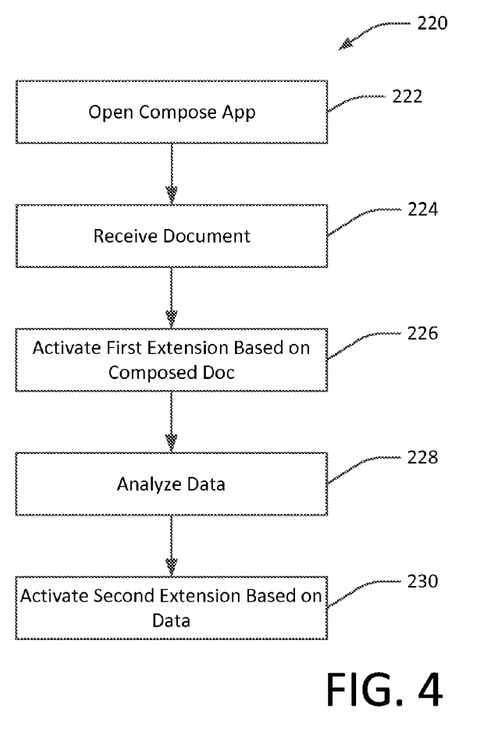
FIG. 4 illustrates aspects of an example of a method for activating extensions.

FIG. 4 is a flow diagram illustrating further aspects of methods disclosed herein. Similarly to the method 200 shown in FIG. 2, the method 220 shown in FIG. 4 includes opening the compose application 110 in block 222. The compose application 110 includes the compose form 102 that is configured to receive a document input from a user as illustrated in block 224. The extension 120 is activated in response to composed document in block 226. In block 228, the extension 120 analyzes data in the received document, and in response to the data, another extension is activated in block 230.

For example, an email message input by a user and received in block 224 contains predetermined properties. The predetermined properties may include terms or dates indicating the document concerns scheduling a meeting. In response thereto, an extension 120 could be activated in block 226 that provides a calendar to the user. As noted above, the extension 120 is web based in some embodiments, so the extension could open a web browser within the application 110, activating a calendar application specified by the extension 120. The extension 120 could then, for example, extract further data indicating the meeting is being scheduled at a meal time. In response, a second extension is activated in block 230 to provide menus to the user, allowing the user to select food for the meeting scheduled via the first extension 120. One of skill in the art will appreciate that the predetermined properties may vary according to the type of compose form being used.

In some implementations, the extension activated in block 226 is configured to modify and/or schematize data from the received document 224 as a property. As used herein, "schematize" refers generally to formatting data that are attached to a document (message, task, appointment, contact, etc.) in a well-known and centrally declared format. Access to the document input in block 224 using the compose form 102 may be provided to the extension via the appropriate APIs, for example. The schematized data may be attached to the composed message by the either of the first or second extensions activated in blocks 226 and 230, or the second extension may initiate another message for sending the schematized data to a recipient, for example.

Figure 5:
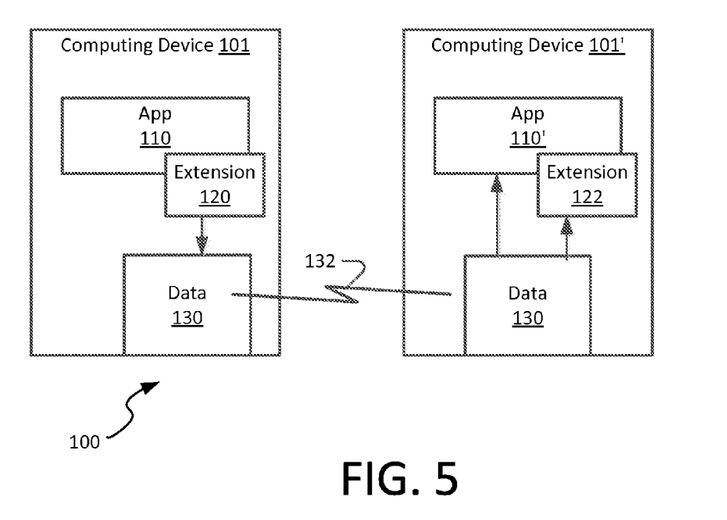
FIG. 5 illustrates aspects of example of computing devices including a compose application and extension.

FIG. 5 illustrates further aspects of the system 100. The system 100 includes the computing device 101 running the compose application 110 and activated extension 120. Data 130 has been extracted from a document input by a user as shown in block 228 of FIG. 4. As noted above, the extracted data 130 may be schematized as a property. In some implementations, the schematized data 130 is then transmitted via a communication connection 132 to a second computing device 101'. The schematized data 130 may be transmitted by the extension 120 as an attachment to the document input in block 224, or as a separate message. The data extraction, schematization and transmission may or may not be transparent to the user.

The extracted data 130 are received by the second computing device 101', which then may consume the received data 130 in various ways. For example, the received data could be received by an application 110' on the second computing system 101', which then activates an extension 122. The extension 122 activated on the second computing system 101' could be the same as the extension 120, a variation of the extension 120, or an entirely different extension, for example. In some embodiments, the extension 120 associated with the compose application 110 is a compose extension, and the extension 122 is read version of the extension 120. In this manner, a particular user interface or user experience is triggered by data 130 contained in the composed document (email message, appointment, task, etc.). Thus, the read experience on the second computing device 101' is driven by the compose form 102 of the sending computing device 101, rather than by the receiving application 110' analyzing and acting on a received document.

The data extraction and schematization process is configured to handle the data 130 in predetermined ways. For example, the extension 120 may be configured to transmit extracted data to a predefined recipient list, or only within the user's network or organization. Or, certain types of data may be categorized and transmitted to appropriate recipient groups.

FIGS. 6-9 and the associated descriptions provide a discussion of a variety of operating environments in which disclosed embodiments may be practiced. However, the devices and systems illustrated and discussed with respect to FIGS. 6-9 are for purposes of example and illustration and are not limiting of a vast number of computing device configurations that may be utilized for practicing embodiments of the invention, described herein.

Figure 6:
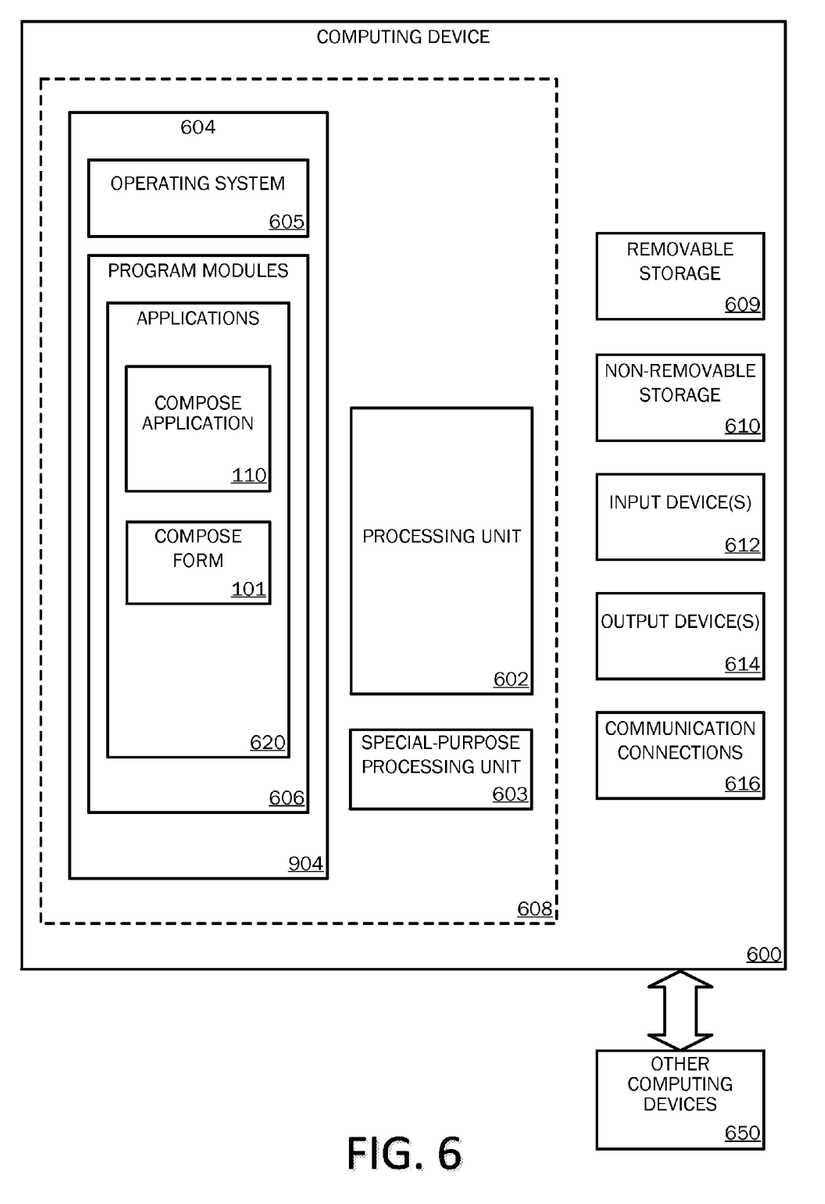
FIGS. 6, 7A, 7B and 8 and the associated descriptions provide a discussion of a variety of operating environments in which disclosed embodiments may be practiced.

FIG. 6 is a block diagram illustrating physical components (i.e., hardware) of a computing device 600 with which embodiments of the invention may be practiced. The computing device components described below may be suitable to act as the computing devices described above, such as the computing device 101 of FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 such as the compose application 110 and associated compose form 102 discussed above in connection with FIG. 1. The operating system 605, for example, may be suitable for controlling the operation of the computing device 600. Furthermore, embodiments of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., compose application 110) may perform processes including, but not limited to, the operations of a message composing application and associated extensions, as described herein. Other program modules that may be used in accordance with embodiments disclosed herein, and in particular to generate screen content, may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the compose application 110 and extensions 120 may be operated via application-specific logic integrated with other components of the computing device 1800 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
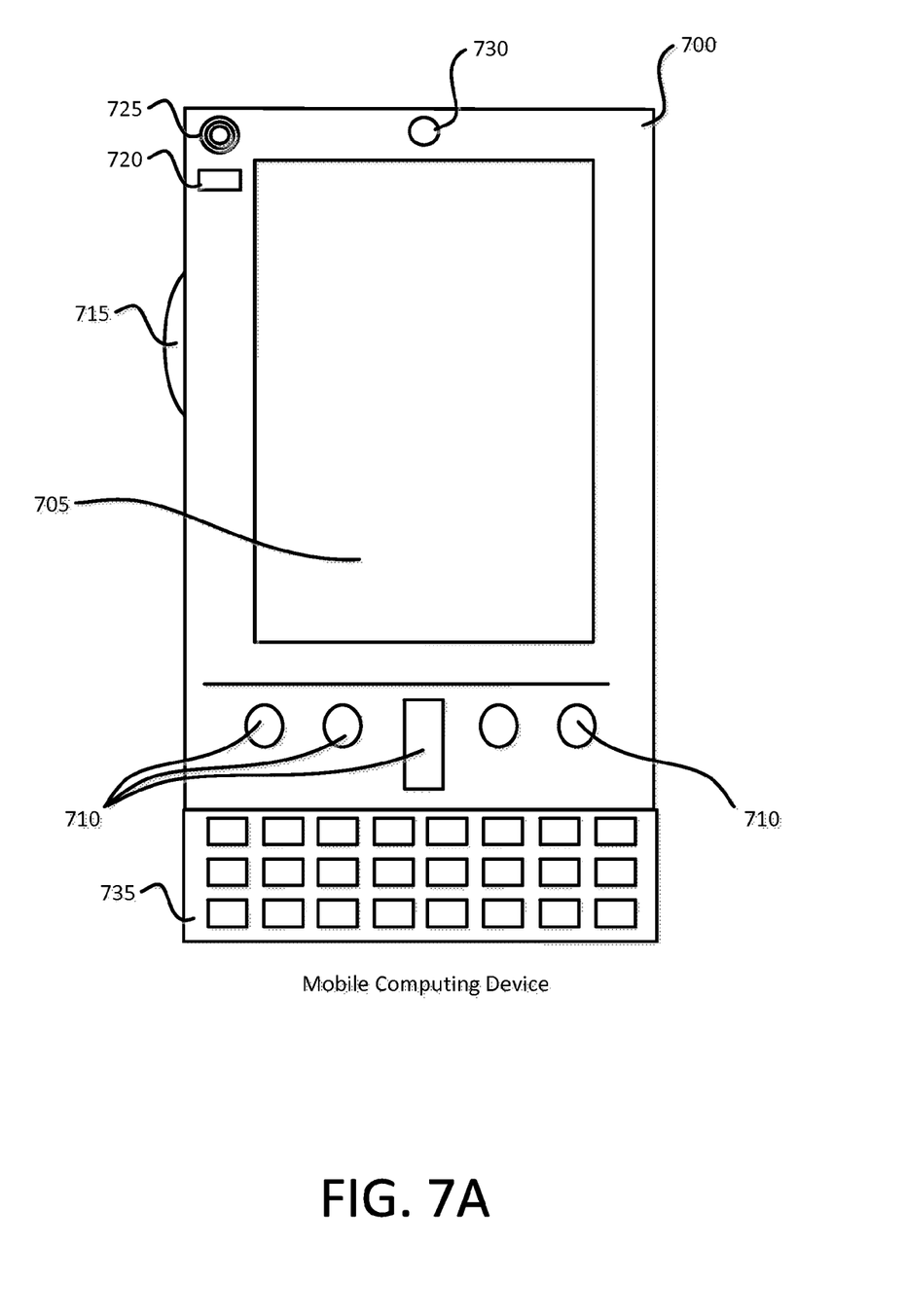
Figure 7B:
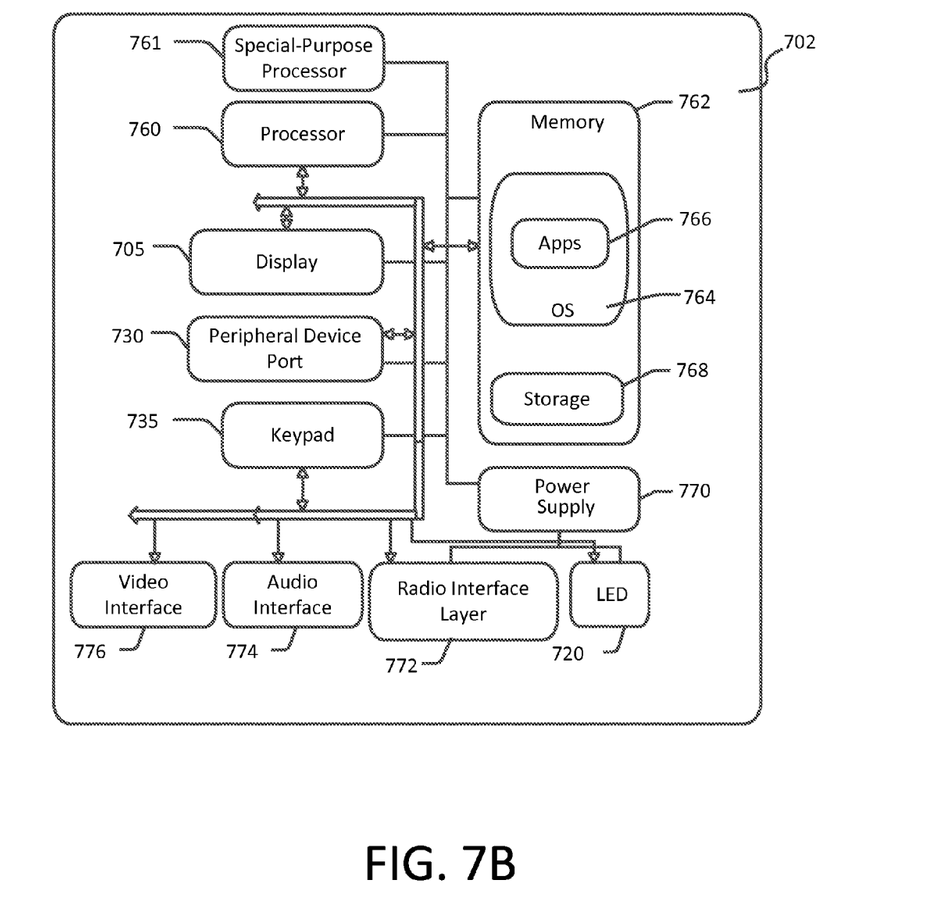

FIGS. 7A and 7B illustrate a mobile computing device 1000, for example, a mobile telephone, a smart phone, a tablet personal computer, a laptop computer, and the like, with which certain embodiments may be practiced. The mobile computing device components described below may be suitable to act as the computing devices described above, such as the tablet computing devices 101a and the mobile phone device 101b shown in FIG. 3. With reference to FIG. 7A, one embodiment of a mobile computing device 1000 for implementing the embodiments is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative embodiments, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some embodiments, the mobile computing device 1000 incorporates a vibration transducer for providing the user with tactile feedback. In yet another embodiment, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 1000 can incorporate a system (e.g., an architecture) 1002 to implement some embodiments. In one embodiment, the system 1902 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including various extensions 120 as described herein.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present invention, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

Figure 8:
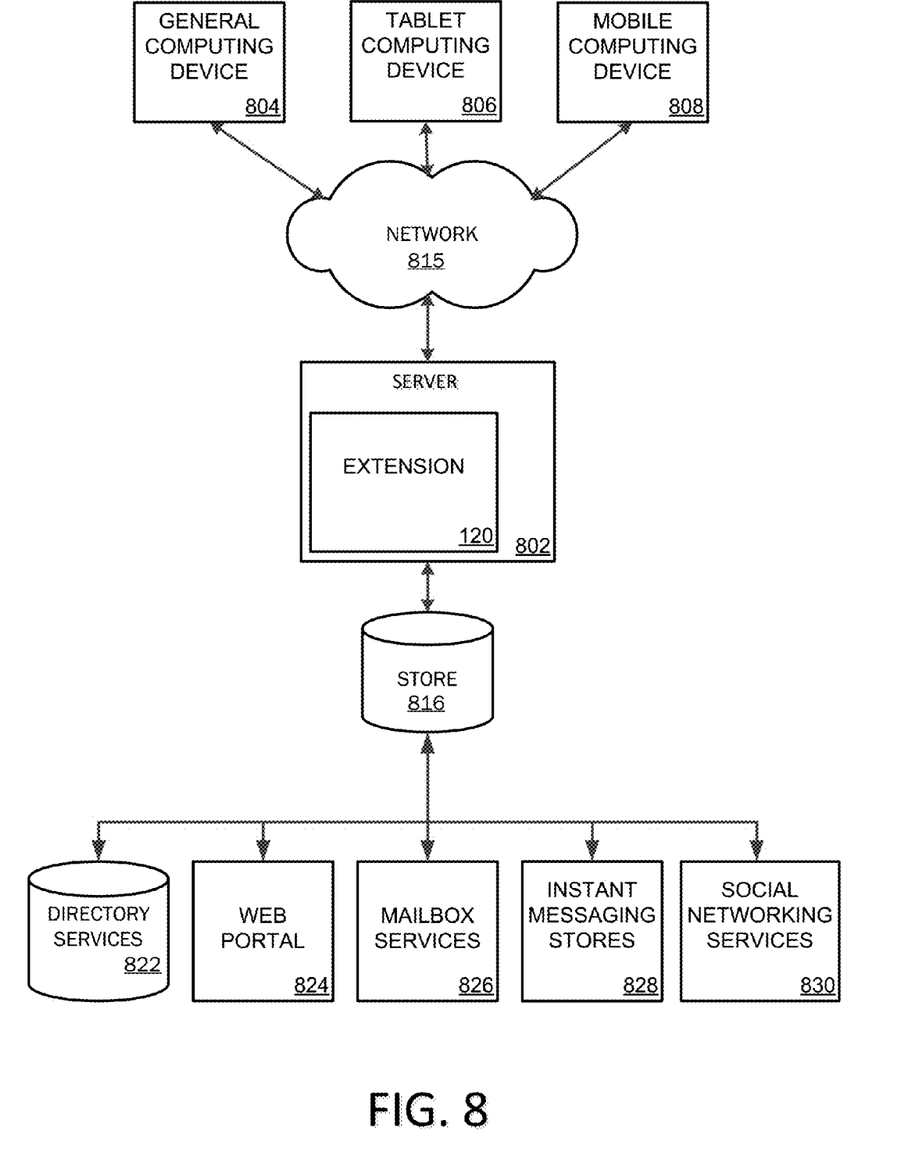

FIG. 8 illustrates one embodiment of the architecture of a system for processing data received at a computing system from a remote source, such as a computing device 804, tablet 806, or mobile device 808, as described above in conjunction with the computing device 101, tablet device 101a and mobile device 101b shown in FIGS. 1 and 3. Content displayed at server device 802 may be stored in different communication channels or other storage types. For example, various documents may be stored using a directory service 822, a web portal 824, a mailbox service 826, an instant messaging store 828, or a social networking site 830. As noted above, the extensions 120 disclosed above may be web based and thus implemented via the server 802. Any of the disclosed computing devices may obtain content from the store 816, including software code for implementing the extensions 120.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of activating an extension, comprising:
opening a first compose application by a first computing device;
receiving a composed document created and entered into the first compose application by a user;
analyzing and schematizing data contained in the composed document;
dynamically activating a web based extension by the first computing device in response to the document as the document is being created and entered into the first compose application by the user, wherein dynamically activating the web based extension includes opening a web browser by the first computing device to activate a web based application configured to run in multiple platforms;
initiating a message by the extension;
attaching the schematized data to the message by the extension;
sending the composed document from the first computing device to a second computing device; and
sending the schematized data to the second computing device by the extension.

2. The method of claim 1, wherein opening a first compose application includes opening one of a plurality of compose forms configured to receive a respective plurality of documents.

3. The method of claim 2, wherein the plurality of compose forms are configured to receive respective documents selected from a group including at least one of a message, an appointment, a contact, and a task.

4. The method of claim 2, further comprising providing an application programming interface (API) for interfacing the extension with the plurality of compose forms.

5. The method of claim 2, further comprising providing a plurality of application programming interfaces (API) associated respectively with the plurality of compose forms for interfacing the extension with the plurality of compose forms.

6. The method of claim 1, wherein activating an extension in response to the document being composed includes activating the extension in response to content of the document being composed.

7. The method of claim 1, wherein activating an extension in response to the document being composed includes activating the extension in response to the document including a predetermined property.

8. The method of claim 1, wherein activating an extension in response to the document being composed includes activating a first extension in response to a first property of the document and activating a second extension in response to a second property of the document.

9. The method of claim 1, further comprising:
receiving the schematized data by a read application on the second computing device; and
dynamically activating the web based extension by the second computing device on the second computing device in response to the received schematized data, wherein dynamically activating the web based extension includes opening a web browser by the second computing device to activate the web based application configured to run in multiple platforms.

10. A system for activating an extension, comprising:
a first computing device including a first processing unit and a memory, the first processing unit being operable to:
open a first software application including a compose form for receiving a document composed by a user;
dynamically activate a first web based extension in response to the received document as the document is being created and entered into the compose form by the user, including opening a web browser by the first computing device to activate a web based application configured to run in multiple platforms, wherein the first extension is configured to:
analyze and schematize data contained in the received document;
extract the schematized data from the received document;
initiate a message;
attach the schematized data to the message;
send the received document to a second computing device;
send the schematized data to the second computing device; and
activate a second extension on the second computing device in response to the received extracted data.

11. The system of claim 10, wherein the first extension is configured to activate the second extension on the first computing device.

12. The system of claim 10, wherein the first and second computing devices are implemented in different platforms.

13. The system of claim 10, wherein dynamically activating the first web based extension in response to the received document includes dynamically activating the first web based extension in response to content of the document being composed.

14. The system of claim 10, wherein dynamically activating the first web based extension includes activating the first web based extension in response to the document including a predetermined property.

15. A computer storage medium storing computer-executable instructions for activating an extension, comprising:
opening a first software application including a compose form on a first computing device, the compose form having a user interface;
analyzing and schematizing data received by the compose form;
determining a type of extension from among a plurality of extension types associated with a plurality of respective predetermined properties in response to the data received by the compose form;
dynamically activating a first web based extension of the determined extension type in response to the data received by the compose form, including opening a web browser by the first computing device to activate a web based application configured to run in multiple platforms, wherein the first extension is configured to modify the user interface of the compose form;

initiating a message by the extension;

attaching the schematized data to the message by the extension; and sending the schematized data to a second computing device by the extension.

16. The computer storage medium of claim 15, further comprising:

extracting data received by the compose form; and activating a second extension in response to the extracted data.

17. The computer storage medium of claim 15, further comprising activating a second extension on the second computing device in response to the extracted data.

18. The computer storage medium of claim 15, further comprising determining the type of extension as the data is entered into the compose form by a user.

19. The computer storage medium claim 15, wherein dynamically activating the first web based extension includes activating the extension in response to the data received by the compose form including a predetermined property.

20. The computer storage medium claim 15, wherein dynamically activating the first web based extension includes activating a first extension in response to a first property of the data and activating a second extension in response to a second property of the data.

* * * * *

UNITED STATES PATENT AND TRADEMARK OFFICE
CERTIFICATE OF CORRECTION

PATENT NO. : 9,672,079 B2
APPLICATION NO. : 14/089043
DATED : June 6, 2017
INVENTOR(S) : Salamatov et al.

Page 1 of 1

It is certified that error appears in the above-identified patent and that said Letters Patent is hereby corrected as shown below:

On the Title Page

Item (72) Inventors: "Jason Henderson," should read --Jason Todd Henderson,--

Signed and Sealed this
Twenty-seventh Day of October, 2020

Andrei Iancu
*Director of the United States Patent and Trademark Office*